(12) United States Patent
Omori

(10) Patent No.: US 11,408,466 B2
(45) Date of Patent: Aug. 9, 2022

(54) THRUST FOIL BEARING

(71) Applicant: IHI CORPORATION, Tokyo (JP)

(72) Inventor: Naomichi Omori, Tokyo (JP)

(73) Assignee: IHI CORPORATION, Tokyo (JP)

( * ) Notice: Subject to any disclaimer, the term of this patent is extended or adjusted under 35 U.S.C. 154(b) by 0 days.

(21) Appl. No.: 17/189,437

(22) Filed: Mar. 2, 2021

(65) Prior Publication Data

US 2021/0190140 A1    Jun. 24, 2021

Related U.S. Application Data

(63) Continuation of application No. PCT/JP2019/034585, filed on Sep. 3, 2019.

(30) Foreign Application Priority Data

Sep. 4, 2018  (JP) .............................. JP2018-165174

(51) Int. Cl.
  *F16C 17/04*  (2006.01)
  *F16C 27/08*  (2006.01)

(52) U.S. Cl.
  CPC ............ *F16C 17/042* (2013.01); *F16C 27/08* (2013.01)

(58) Field of Classification Search
  CPC .............................. F16C 17/024; F16C 17/042
  See application file for complete search history.

(56) References Cited

U.S. PATENT DOCUMENTS

| | | | |
|---|---|---|---|
| 5,833,369 A | 11/1998 | Heshmat | |
| 6,224,263 B1 | 5/2001 | Saville et al. | |
| 6,261,002 B1 | 7/2001 | Ermilov et al. | |
| 9,175,722 B1* | 11/2015 | Park | ...................... F16C 17/042 |
| 2012/0207414 A1 | 8/2012 | Kim | |
| 2014/0169707 A1 | 6/2014 | Yoshino | |
| 2015/0219147 A1 | 8/2015 | Furuno | |
| 2015/0330443 A1 | 11/2015 | Omori | |
| 2016/0195129 A1 | 7/2016 | Omori | |

(Continued)

FOREIGN PATENT DOCUMENTS

| | | |
|---|---|---|
| CN | 102753849 A | 10/2012 |
| CN | 106415033 A | 2/2017 |

(Continued)

OTHER PUBLICATIONS

China National Intellectual Property Administration, Search Report and Office Action, issued in Chinese Patent Application No. 17189437.4, which is a counterpart to U.S. Appl. No. 17/189,437, dated May 24, 2022.

(Continued)

*Primary Examiner* — James Pilkington

(57) ABSTRACT

A thrust foil bearing of this disclosure includes: a base plate provided with an insertion hole through which a rotation shaft is inserted; a corrugated bump foil placed around the insertion hole and supported by the base plate; and a top foil which is supported by the bump foil, and in which one side in a circumferential direction of the insertion hole is attached to the base plate and the other side in the circumferential direction of the insertion hole is a free end, and in the thrust foil bearing, a bent portion which is bent toward the base plate is formed on the other side of the top foil in the circumferential direction.

4 Claims, 10 Drawing Sheets

(56) References Cited

U.S. PATENT DOCUMENTS

2017/0191522 A1 7/2017 Kim
2017/0298983 A1 10/2017 Omori

FOREIGN PATENT DOCUMENTS

| | | | |
|---|---|---|---|
| CN | 107208694 | A | 9/2017 |
| CN | 108253013 | A | 7/2018 |
| EP | 3171047 | * | 5/2017 |
| JP | 2001-519017 | A | 10/2001 |
| JP | 2002-195257 | A | 7/2002 |
| JP | 2002-535570 | A | 10/2002 |
| JP | 2003-120213 | A | 4/2003 |
| JP | 2003-148461 | A | 5/2003 |
| JP | 2013-047555 | A | 3/2013 |
| JP | 2014-145388 | A | 8/2014 |
| JP | 2015-059629 | A | 3/2015 |
| JP | 2018-040413 | A | 3/2018 |
| WO | 2014/061698 | A1 | 4/2014 |
| WO | 2017/169842 | A1 | 10/2017 |
| WO | 2018/016268 | A1 | 1/2018 |

OTHER PUBLICATIONS

He Huan-yuan et al., "Characteristic Research on Pressure Fields of Separation-type Bump Foil Hydrodynamic Thrust Bearings," Machine Building & Automation, vol. 44, No. 2, Feb. 2015, pp. 4-6.
Xie Shilong et al., "Influence of Fixed Types to Structural Stiffness of Foil in Bump-Type Gas Bearing," Lubrication Engineering, vol. 40, No. 6, Jun. 2015, pp. 40-45, 69.

* cited by examiner

THRUST FOIL BEARING

CROSS REFERENCE TO RELATED APPLICATIONS

The present application is a continuation application of International Application No. PCT/JP2019/034585, filed on Sep. 3, 2019, which claims priority to Japanese Patent Application No. 2018-165174, filed on Sep. 4, 2018. The contents of these applications are incorporated herein by reference in their entirety.

TECHNICAL FIELD

This disclosure relates to a thrust foil bearing.

In the related art, as a bearing for a high-speed rotation body, a thrust foil bearing disposed to face a thrust collar provided on a rotation shaft is known. The thrust foil bearing has a bearing surface formed by a flexible foil (a thin metal plate) to be able to absorb movement of the rotation shaft (axial displacement and inclination of the thrust collar) generated by vibration or impact, and has a foil structure to flexibly support the bearing surface below the bearing surface.

The thrust foil bearing has a form in which a plurality of top foil pieces and back foil pieces are arranged in a circumferential direction. The top foil pieces are supported by the back foil pieces, and air is introduced between the top foil pieces and the thrust collar by the rotation of the thrust collar. The air forms a wedge-shaped fluid lubricating film between the top foil pieces and the thrust collar, and a load capacity of the thrust foil bearing is exhibited.

DOCUMENTS OF THE RELATED ART

Patent Document

[Patent Document 1]
International Publication No. 2014/061698
[Patent Document 2]
U.S. Pat. No. 5,833,369

SUMMARY

Incidentally, in the aforementioned thrust foil bearing, when a pressure of the fluid lubricating film acts on the top foil, the pressure becomes the highest on a downstream end side of the top foil. Therefore, bending (deflection) in a radial direction increases on the downstream end side of the top foil. That is, on the downstream end side of the top foil, an outer portion in the radial direction becomes closer to a base plate than an inner portion in the radial direction, and an interval between the top foil and the thrust collar opposite thereto is widened. Then, it becomes difficult for the pressure of the fluid lubricating film to rise at the outer portion, and the load capacity of the bearing decreases.

If the top foil is made thick, the bending can be reduced. However, if the top foil becomes thicker, the inclination deformation in the circumferential direction is hindered. When the inclination deformation in the circumferential direction is hindered, it is difficult to form an appropriate taper angle, and the bearing load capacity decreases. In this way, the top foil is required to have rigidity (anisotropic rigidity) that is strong against bending in the radial direction and is flexible in the circumferential direction.

The present disclosure has been made in view of the aforementioned problems, and an object thereof is to suppress bending in the radial direction on the downstream end side of the top foil.

According to an aspect of the present disclosure, there is provided a thrust foil bearing which includes a base plate provided with an insertion hole through which a shaft is inserted, a corrugated bump foil placed around the insertion hole and supported by the base plate, and a top foil which is supported by the bump foil, and in which one side in a circumferential direction of the insertion hole is attached to the base plate, and the other side in the circumferential direction of the insertion hole is a free end, and in the thrust foil bearing, a bent portion which is bent toward the base plate is formed on the other side of the top foil in the circumferential direction.

Further, in the aforementioned aspect of the present disclosure, the bent portion may have a mountain shape which extends from a downstream end of the inner and outer circumferences of the top foil toward a single peak on the base plate side.

Further, in the aforementioned aspect of the present disclosure, the peak may be on an outer peripheral side of the top foil in a radial direction of the insertion hole.

Further, in the aforementioned aspect of the present disclosure, a plurality of bends may be formed in the bent portion.

Further, in the aforementioned aspect of the present disclosure, the bent portion may be curved in a circular arc shape.

According to the present disclosure, it is possible to suppress bending of the top foil in the radial direction on the downstream end side of the top foil.

DETAILED DESCRIPTION

Hereinafter, a thrust foil bearing of the present disclosure will be described in detail with reference to the drawings.

Figure 1:
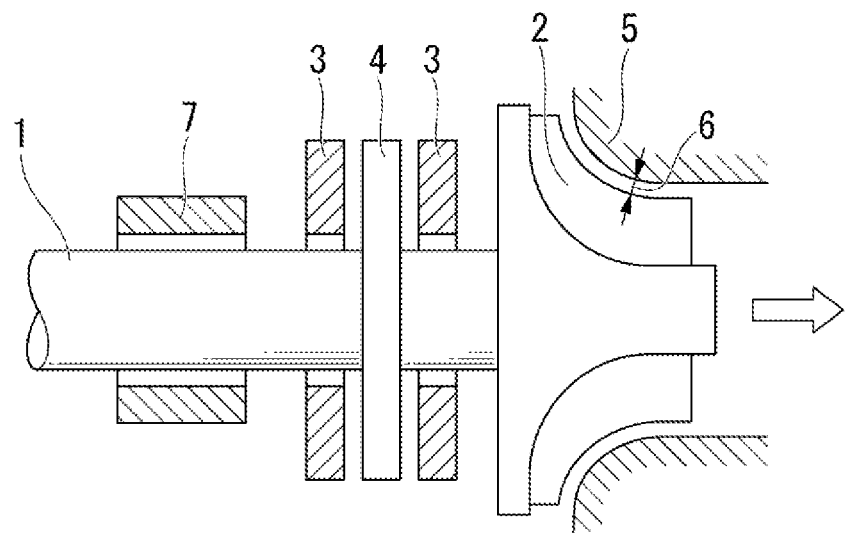
FIG. 1 is a side view showing an example of a turbo machine to which a thrust foil bearing of the present disclosure is applied.

FIG. 1 is a side view showing an example of a turbo machine to which a thrust foil bearing of the present disclosure is applied.

In FIG. 1, reference numeral 1 is a rotation shaft (shaft), reference numeral 2 is an impeller provided at a tip of the rotation shaft, and reference numeral 3 is a thrust foil bearing according to the present disclosure.

A disk-shaped thrust collar 4 is fixed to the rotation shaft 1. The thrust collar 4 is sandwiched between a pair of thrust foil bearings 3. The impeller 2 is disposed in a housing 5 on a stationary side and with a tip clearance 6 provided between the impeller 2 and the housing 5. The rotation shaft 1 is supported by a radial foil bearing 7.

Figure 2:
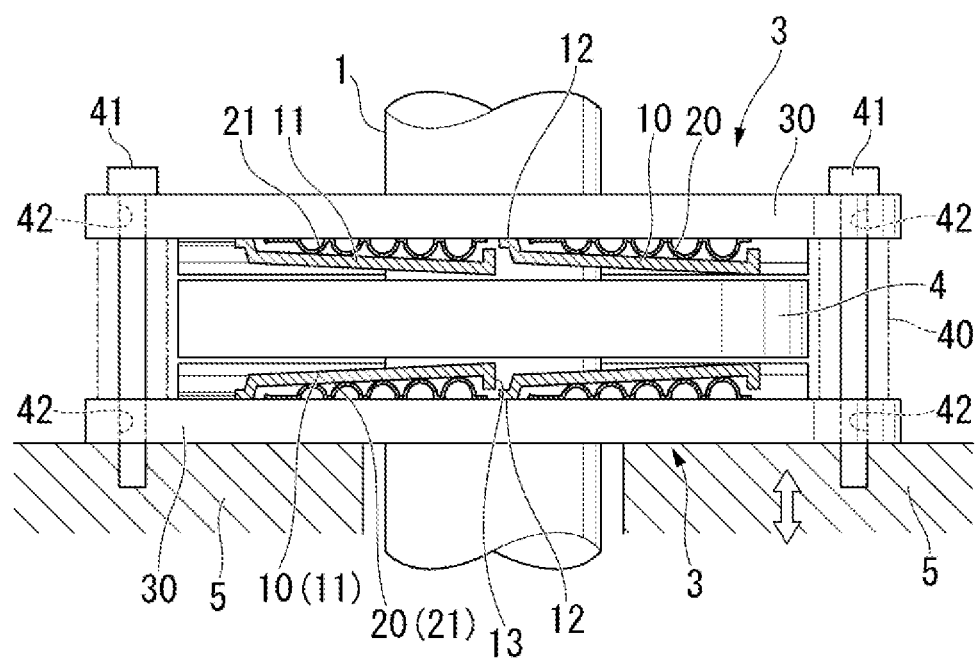
FIG. 2 is a side view showing the thrust foil bearing of the present disclosure.
Figure 3:
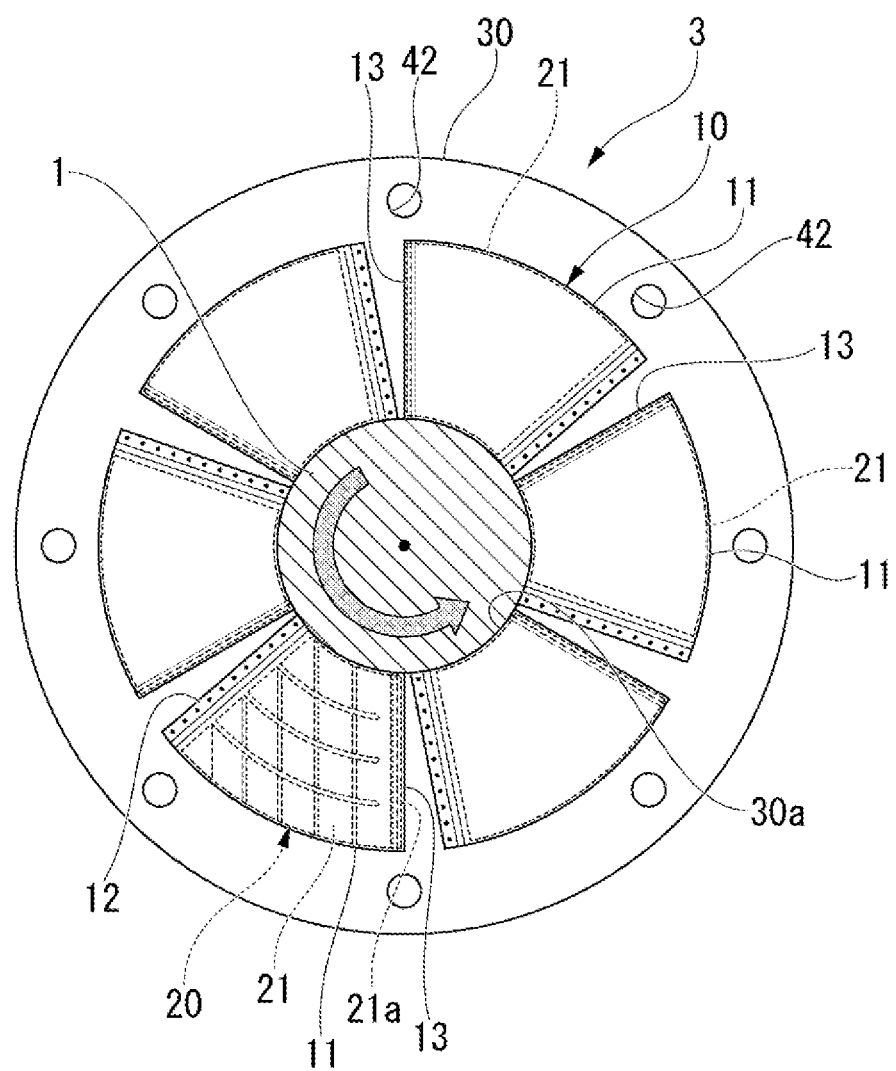
FIG. 3 is a plan view showing the thrust foil bearing of the present disclosure.
Figure 4A:
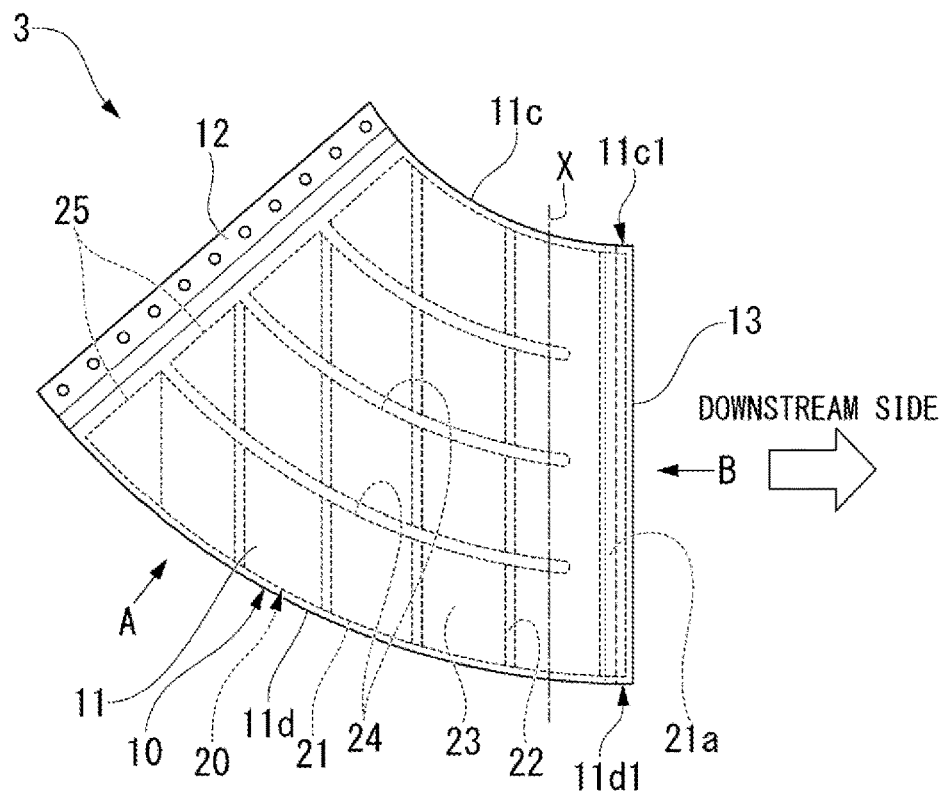
FIG. 4A is a configuration diagram showing a bump foil piece and a top foil piece of the present disclosure.
Figure 4B:
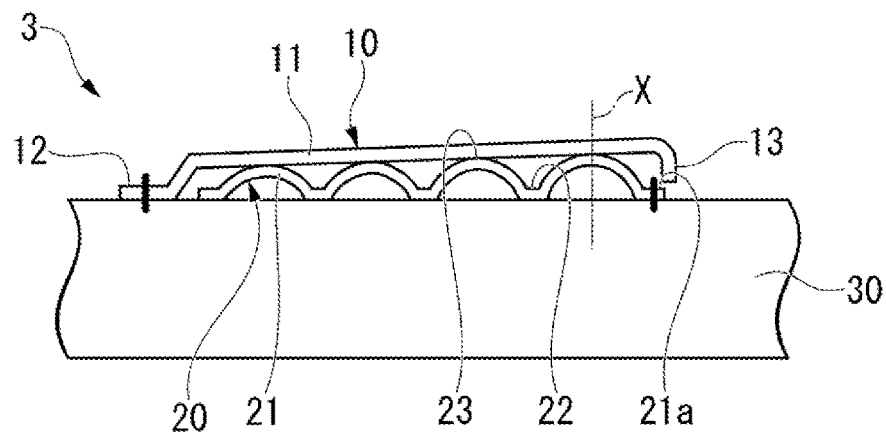
FIG. 4B is a configuration diagram showing the bump foil piece and the top foil piece of the present disclosure.
Figure 4C:
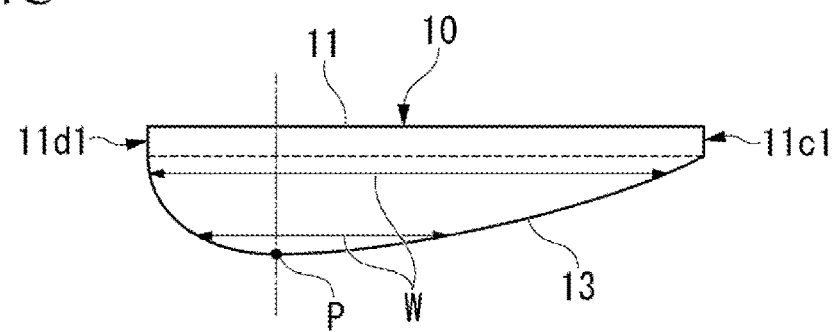
FIG. 4C is a configuration diagram showing the bump foil piece and the top foil piece of the present disclosure.

FIG. 2 is a side view showing the thrust foil bearing 3 of the present disclosure. FIG. 3 is a plan view showing the thrust foil bearing 3 of the present disclosure. FIGS. 4A, 4B, and 4C are configuration diagrams showing a bump foil piece 21 and a top foil piece 11 of the present disclosure. FIG. 4A shows a plan view, and FIG. 4B shows a diagram along an arrow A in FIG. 4A (a diagram viewed from A in the direction of the arrow in the drawing). That is, FIG. 4B is a diagram of the bump foil piece 21 and the top foil piece 11 viewed from the outside in the radial direction. FIG. 4C shows a diagram along an arrow B in FIG. 4A (a diagram viewed from B in the direction of the arrow). That is, FIG. 4C is a diagram showing a side which is a free end in an end edge of the top foil piece 11 in the circumferential direction.

As shown in FIG. 2, the thrust foil bearings 3 are provided in pairs on both sides of the thrust collar 4. Both of the pair of thrust foil bearings 3 have the same configuration. The thrust foil bearing 3 includes a top foil 10, a bump foil 20, and a base plate 30. As shown in FIG. 3, the base plate 30 is provided with an insertion hole 30a through which the rotation shaft 1 is inserted.

In the following description, a positional relationship of each member may be described on the basis of the insertion hole 30a. Specifically, "axial direction" refers to a direction in which the insertion hole 30a extends (a direction in which the rotation shaft 1 is inserted). Further, "radial direction" refers to a radial direction of the insertion hole 30a. "Circumferential direction" refers to a circumferential direction along an inner peripheral surface of the insertion hole 30a. Alternatively, on the basis of an axis of the rotation shaft 1 inserted through the insertion hole 30a, they can also be called "radial direction" and "circumferential direction" as viewed from the axis.

The base plate 30 is a disk-shaped member that constitutes an outermost portion (a side opposite to the thrust collar) of the thrust foil bearing 3 in the axial direction. An insertion hole 30a is formed in the base plate 30. That is, the base plate 30 of the present disclosure is an annular member. The base plate 30 includes a flat surface that is disposed to face the thrust collar 4. A bump foil 20 and a top foil 10 are disposed around the insertion hole 30a (opening) of the flat surface of the base plate 30. Specifically, the bump foil 20 is supported by the base plate 30, and the top foil 10 is supported by the bump foil 20. The base plate 30 of the present disclosure is a disk-shaped member provided with the insertion hole 30a. However, as long as the insertion hole 30a is provided, the base plate 30 may be a member other than a disk shape (for example, a rectangular plate shape). Further, the insertion hole 30a does not necessarily need to have a strict cylindrical shape.

As shown in FIG. 2, a cylindrical bearing spacer 40 indicated by a double-dashed chain line is sandwiched between the respective base plates 30 of the pair of thrust foil bearings 3. Further, the base plates 30 are connected by fastening bolts 41 via bearing spacers 40. One of the base plates 30 is fixed to the housing 5 by the fastening bolts 41.

The base plate 30 is formed of, for example, a metal plate having a thickness of about several mm. As shown in FIG. 3, a plurality of penetration holes 42 for inserting the fastening bolts 41 are formed on the outer peripheral portion of the base plate 30. The base plate 30 supports the bump foil 20 and the top foil 10 on the surface of the base plate 30 on the side facing the thrust collar 4. In the present disclosure, as will be described later, the bump foil 20 and the top foil 10 are each formed by a plurality of (six) bump foil pieces 21 and top foil pieces 11. The base plate 30 of the present disclosure supports the bump foil pieces 21 and the top foil pieces 11 in each of the six equally spaced regions in the circumferential direction of the surface of the base plate 30 on the side facing the thrust collar 4.

As shown in FIG. 3, the bump foil 20 is formed by the six bump foil pieces 21 arranged in the circumferential direction. In the present disclosure, the bump foil pieces 21 are formed to be smaller than the top foil pieces 11 to be described later in the plan view shown in FIG. 3. Therefore, the bump foil pieces 21 are covered with the top foil pieces 11 on the base plate 30 as shown in FIG. 3 when viewed from the axial direction. Further, in the present disclosure, the respective top foil pieces 11 are separated in the circumferential direction. Further, the interval in the circumferential direction between the top foil pieces 11 adjacent to each other in the circumferential direction becomes wider from the inner peripheral side toward the outer peripheral side.

The bump foil pieces 21 are corrugated foils (thin plates). Each bump foil piece 21 elastically supports the top foil piece 11. As shown in FIG. 3, each of the bump foil pieces 21 is generally formed in a substantially trapezoidal shape in which an apex side of a fan shape is notched and the inner peripheral side and the outer peripheral side each have a circular arc shape. That is, the bump foil pieces 21 are spaced in the circumferential direction, and include two end edges extending from the inner peripheral side to the outer peripheral side, an end edge of the inner peripheral side that connects the two end edges on the inner peripheral side, and an end edge of the outer peripheral side that connects the two end edges on the outer peripheral side. The bump foil pieces 21 of the present disclosure each include a first side end which is an end edge on one side in the circumferential direction, a second side end which is an end edge on the other side in the circumferential direction, a circular arc-shaped outer peripheral end which connects end portions on the outer peripheral side of each of the first and second side ends, and a circular arc-shaped inner peripheral end which connects end portions on the inner peripheral side of each of the first and second side ends. Here, the thrust collar 4 rotates to the other side in the circumferential direction.

The first side end of the bump foil piece 21 is formed by a plurality of end edges separated from the inner peripheral side to the outer peripheral side. That is, the bump foil piece 21 is formed with a plurality of slits 24 extending from the first side end to the second side end. As shown in FIG. 4B, the bump foil piece 21 is formed by alternately disposing a valley portion 22 and a peak portion 23. That is, the valley portion 22 and the peak portion 23 are continuous from one side in the circumferential direction to the other side in the circumferential direction at each portion branched by the slit 24 of the bump foil piece 21. The valley portion 22 and the peak portion 23 extend linearly via the slit 24. The valley portion 22 of the present disclosure has a flat surface and faces the base plate 30. Further, the peak portion 23 is an arch-shaped portion that connects the adjacent valley portions 22. The bump foil piece 21 is supported by the base plate 30. Therefore, the valley portion 22 can come into contact with the base plate 30.

In the bump foil piece 21 of the present disclosure, the valley portion 22 extends to one of the inner peripheral end or the outer peripheral end. The position of the bump foil piece 21 on the other side in the circumferential direction is spot-welded (dot-welded) to the base plate 30. That is, the welding position is an attaching position of the bump foil piece 21 to the base plate 30. Further, the attaching position of the bump foil piece 21 is the valley portion 22. In the present disclosure, the attaching position of the bump foil piece 21 is the valley portion 22 located on the most other side in the circumferential direction. Further, one side of the bump foil piece 21 in the circumferential direction is a free end. That is, when a load acts on the bump foil piece 21, the end edge on one side in the circumferential direction can move toward one side in the circumferential direction. The bump foil piece 21 can also be attached to the base plate 30 by, for example, screwing, in addition to spot welding.

The valley portion 22 and the peak portion 23 are alternately arranged in a direction (intersection direction) orthogonal to an end side 21*a* (fixed end) of the bump foil piece 21 on the other side in the circumferential direction. That is, the valley portion 22 and the peak portion 23 extend to be parallel with the fixed end. The valley portion 22 and the peak portion 23 are formed at substantially equal pitches, respectively. Further, a height of the peak portion 23 is formed to increase sequentially as shown in FIG. 4B from a side opposite to the end side 21*a* toward the end side 21*a*, that is, to a downstream side in the rotation direction (from one side to the other side in the circumferential direction) of the rotation shaft 1 (thrust collar 4) indicated by the arrow in FIG. 3.

Therefore, the top foil piece 11 supported by the bump foil piece 21 is disposed to be inclined at an initial inclination angle to gradually move away from the base plate 30 as it goes from the fixed end 12 (fixed side) side to the end side 21*a* side of the bump foil piece 21 along the arrangement direction of the valley portion 22 and the peak portion 23. Here, the initial inclination angle means the inclination angle of the top foil piece 11 with respect to the base plate 30 when the load is zero.

As shown in FIG. 4A, the bump foil piece 21 on one side in the circumferential direction (upstream side in the rotation direction) is divided into a plurality of (four in the present disclosure) end sides 25 in the radial direction. Each of the four end sides 25 is displaceable in the circumferential direction. A slit 24 is formed between the four end sides 25. The slit 24 of the present disclosure is formed in a circular arc shape that forms a part of a concentric circle together with the insertion hole 30*a*. Further, the slit 24 of the present disclosure extends to the peak portion 23 adjacent to the attaching position of the bump foil piece 21 to the base plate 30.

That is, the slit 24 extends to a position between the attaching position of the bump foil piece 21 and the valley portion 22 adjacent to the attaching position on one side in the circumferential direction.

As shown in FIG. 3, the top foil 10 is also formed by six top foil pieces 11 arranged in the circumferential direction. The top foil pieces 11 are formed in a substantially trapezoidal shape in which the apex side of the fan shape is notched and the inner peripheral side and the outer peripheral side each have a circular arc shape, by a thin metal plate (foil). That is, the top foil pieces 11 are separated in the circumferential direction, and include two end edges extending from the inner peripheral side to the outer peripheral side, an end edge of the inner peripheral side which connects the two end edges on the inner peripheral side, and an end edge of the outer peripheral side that connects the two end edges on the outer peripheral side. The top foil piece 11 of the present disclosure includes a first side end which is an end edge on one side in the circumferential direction, a second side end which is an end edge on the other side in the circumferential direction, a circular arc-shaped outer peripheral end which connects the end portions on the outer peripheral side of each of the first and second side ends, and a circular arc-shaped inner peripheral end which connects the end portions on the inner peripheral side of each of the first and second side ends. The top foil piece 11 has a bent portion 13 on the other side (downstream side in the rotation direction) in the circumferential direction. The top foil piece 11 having such a shape covers the bump foil piece 21 on the base plate 30 and is generally disposed in a substantially annular plate shape to form the top foil 10.

The position of the top foil piece 11 on one side in the circumferential direction is spot-welded (dot-welded) to the base plate 30. In the present disclosure, a plurality of points on the same straight line are spot-welded, and are spot-welded to the base plate 30 on a straight line extending in the radial direction from the axis of the insertion hole 30*a*. That is, this welding position is the attaching position (fixed end 12) of the top foil piece 11 to the base plate 30. Further, the attaching position of the top foil piece 11 is disposed to be separated from the bump foil piece 21 to one side in the circumferential direction. Further, the other side of the top foil piece 11 in the circumferential direction is a free end. That is, when a load acts on the top foil piece 11, the end edge on the other side in the circumferential direction can move toward the other side in the circumferential direction. The top foil piece 11 can be attached to the base plate 30 by, for example, screwing, in addition to spot welding.

As shown in FIG. 4B, the top foil piece 11 is bent on the fixed end 12 side, and includes a portion in which a height gradually increases toward the other side in the circumferential direction along the arrangement of the peak portion 23 formed on the bump foil piece 21, on the other side in the circumferential direction from the bent portion of the fixed end 12 side. The bent portion on the fixed end 12 side of the present disclosure includes a first bending, and a second bending located on the other side of the first bending in the circumferential direction. The first bending is bent toward a back surface side of the surface of the top foil piece 11 facing the base plate 30. The second bending is bent toward the surface of the top foil piece 11 facing the base plate 30. That is, the bent portion on the fixed end 12 side has a stepped shape. Both the first bending and the second bending have obtuse angles. The other side (bent portion 13 side) in the circumferential direction from the fixed end 12 is placed on the peak portion 23. On the other hand, the bent portion 13 (trailing edge) is a free end without being fixed.

As shown in FIG. 4A, the top foil piece 11 has an end side 11c on the inner peripheral side, and an end side 11d on the outer peripheral side. The end side 11c on the inner peripheral side of the present disclosure is formed in a circular arc shape that forms a part of a concentric circle together with the insertion hole 30a. Further, the end side 11d on the outer peripheral side is formed in a circular arc shape that forms a part of a concentric circle (a concentric circle having a diameter larger than the concentric circle formed by the end side 11c) together with the insertion hole 30a.

The bent portion 13 is formed on the downstream end side of the top foil piece 11 in the rotation direction of the rotation shaft 1. That is, the bent portion 13 is located on the other side in the circumferential direction from a virtual straight line X supported by the peak portion 23 located on the most other side of the bump foil piece 21 in the circumferential direction. Here, the virtual straight line X is a tangent line on which the bump foil piece 21 is in contact with the top foil piece 11 on the most downstream side in the rotation direction of the rotation shaft 1. As shown in FIG. 4B, the bent portion 13 is bent at a substantially right angle to the base plate 30 side. As shown in FIG. 4A, a folding line of the bent portion 13 extends linearly in the radial direction. That is, the folding line of the bent portion 13 extends parallel to the end side 21a of the bump foil piece 21. As shown in FIG. 4B, the bent portion 13 is disposed on the downstream side in the rotational direction from the peak portion 23 adjacent to the end side 21a of the bump foil piece 21. Such a bent portion 13 can be formed by, for example, a pressing process of the top foil piece 11.

As shown in FIG. 4C, the bent portion 13 has a mountain shape extending from the downstream ends 11c1 and 11d1 of the inner and outer circumferences of the top foil piece 11 toward a single peak P existing on the base plate 30 side. That is, the bent portion 13 includes the single peak P toward the base plate 30 side. The peak P of the bent portion 13 is a portion closest to the base plate 30 side, and may be not only an apex but also a side (linear peak) having a certain width. That is, a width W in the radial direction on the free end side of the top foil piece 11 which is the apex or the side is reduced toward the free end. That is, in the present disclosure, the radial width W is reduced from the folding line of the bent portion 13 toward the peak P. As shown in FIG. 4C, the peak P of the bent portion 13 of the present disclosure exists on the outer peripheral side of the top foil piece 11. Here, the outer peripheral side of the top foil piece 11 means a region on the outermost side in the radial direction when the top foil piece 11 is divided into three in the radial direction. Further, the bent portion 13 has the same thickness as the portion of the top foil piece 11 other than the bent portion 13. The end edge of the bent portion 13 of the present disclosure faces the base plate 30 side. That is, the end edge of the top foil piece 11 on the other side in the circumferential direction faces the base plate 30 side. Further, the folding line of the bent portion 13 of the present disclosure is located on the other side in the circumferential direction from the apex portion of the peak portion 23 located on the most other side in the circumferential direction, among the circumferential directions of the bump foil piece 21 that overlaps the top foil piece 11 in the axial direction.

Next, the operation of the thrust foil bearing 3 having such a configuration will be described.

As shown in FIG. 2, the thrust foil bearings 3 are provided on both sides to sandwich the thrust collar 4. Therefore, it is possible to suppress the movement of the rotation shaft 1 to both sides in a thrust direction.

When the rotation shaft 1 rotates in such a state and the thrust collar 4 starts rotating, while the thrust collar 4 and the top foil piece 11 rub against each other, the surrounding fluid is pushed into the wedge-shaped space formed between the thrust collar 4 and the top foil piece 11. Further, when the thrust collar 4 reaches a constant rotation speed, a fluid lubricating film is formed between the thrust collar 4 and the top foil piece 11. The top foil piece 11 (top foil 10) is pressed toward the bump foil piece 21 (bump foil 20) by the pressure of the fluid lubricating film, and the thrust collar 4 leaves the contact state with the top foil piece 11 and rotates in a non-contact manner.

At this time, the bump foil piece 21 is pressed toward the base plate 30, and the inclination angle of the top foil piece 11 becomes shallower (smaller) than the initial inclination angle. Since the bump foil piece 21 is divided into four (plurality) in the radial direction on the upstream side in the rotation direction of the rotation shaft 1, each end side 25 (divided piece) can move independently. That is, each end side 25 can have a different amount of deformation. As a result, the bump foil piece 21 is smoothly deformed in the circumferential direction.

Figure 5:
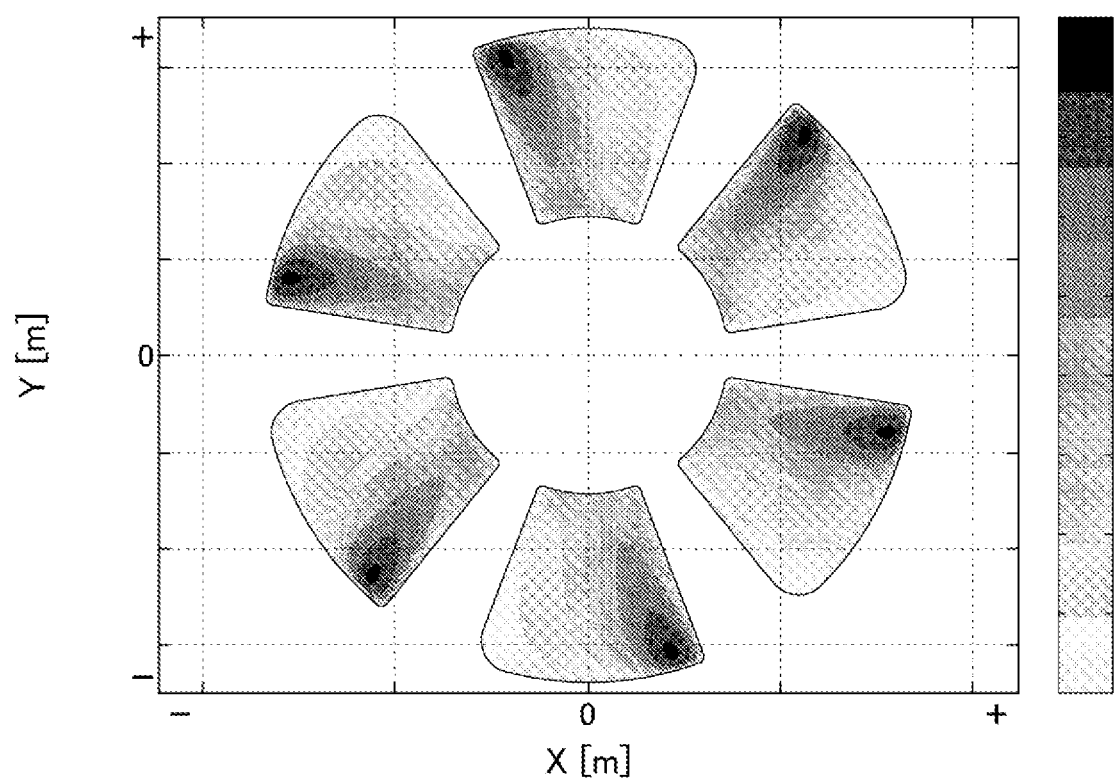
FIG. 5 is an analysis diagram showing a pressure distribution of a fluid lubricating film acting on the top foil piece (without a bent portion) according to an embodiment.

FIG. 5 is an analysis diagram showing the pressure distribution of the fluid lubricating film acting on the top foil piece (without bent portion) according to an embodiment. In FIG. 5, a level of pressure is indicated by the shade of dots.

Since the downstream end side of the top foil piece is the narrowest portion of the wedge-shaped space, a high pressure due to the fluid lubricating film acts, as shown in FIG. 5. In FIG. 5, although the high pressure due to the fluid lubricating film acts on the outer peripheral side of the top foil piece, the position may change in the radial direction depending on the support rigidity of the bump foil piece. However, since the peripheral speed of the thrust collar is faster on the outer peripheral side of the top foil piece than on the inner peripheral side thereof, a high pressure due to the fluid lubricating film tends to act on the outer peripheral side of the top foil piece.

Figure 6A:
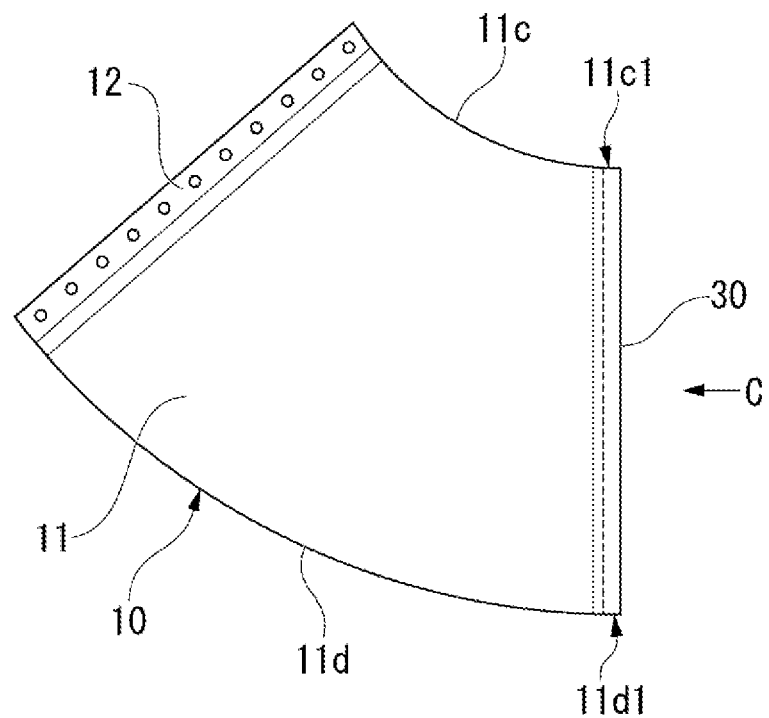
FIG. 6A is a diagram showing the operation of the top foil piece having the bent portion of the present disclosure.
Figure 6B:
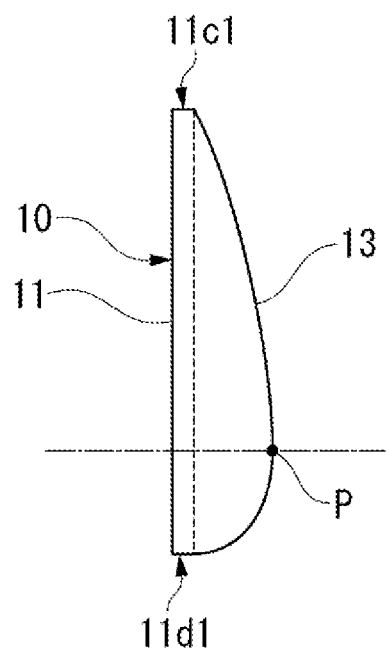
FIG. 6B is a diagram showing the operation of the top foil piece having the bent portion of the present disclosure.

FIGS. 6A and 6B are diagrams showing the operation of the top foil piece 11 having the bent portion 13 of the present disclosure. FIG. 6A shows a plan view, and FIG. 6B shows a diagram taken along an arrow C (a diagram viewed from C in the direction of the arrow in the drawing) in FIG. 6A.

As described above, because a high pressure due to the fluid lubricating film acts on the downstream end side of the top foil piece 11, the downstream end side of the top foil piece 11 receives a force that is bent (deflects) in the radial direction. Here, the top foil piece 11 of the present disclosure has the bent portion 13 on the downstream end side in the rotation direction of the rotation shaft 1.

According to this configuration, since the downstream end side of the top foil piece 11 is bent due to the bent portion 13, it is possible to increase the rigidity (cross-sectional secondary moment) of the top foil piece 11 against bending in the radial direction. Therefore, even if a high pressure due to the fluid lubricating film acts on the downstream end side of the top foil piece 11, the downstream end side of the top foil piece 11 is suppressed from falling to the base plate 30 side. As a result, a strong fluid lubricating film is formed on the top foil piece 11, and the non-contact state with the thrust collar 4 is maintained even at the time of a high load.

Further, when the lubricating fluid compressed from the upstream side of the top foil piece 11 to generate heat is discharged from the downstream end side of the top foil piece 11, a flow trajectory is twisted by the bent portion 13, and stirring with the surrounding (cooled) lubricating fluid is likely to occur. As a result, since the temperature of the lubricating fluid flowing into the adjacent top foil piece 11 disposed on the downstream side in the rotation direction is lowered, the cooling effect of the thrust foil bearing 3 is enhanced.

Further, in the present disclosure, as shown in FIG. 6B, the bent portion 13 has a mountain shape extending from the downstream ends 11c1 and 11d1 of the inner and outer circumferences of the top foil piece 11 toward a single peak P existing on the base plate 30 side. According to this configuration, it is not necessary to increase the bending rigidity of the top foil piece 11 in a portion (near the end side on the inner peripheral side and the end side of the outer peripheral side of the top foil piece) in which the pressure due to the fluid lubricating film is relatively smaller than the outer peripheral side of the downstream end of the top foil piece 11 in the analysis diagram of FIG. 5. Further, the fluid flowing on the back side of the top foil piece 11 passes through the side of the bent portion 13. That is, since the end edge of the top foil piece 11 on the other side in the circumferential direction is not in contact with the base plate 30, the lubricating fluid cooled by touching the base plate 30 flows into the top foil piece 11 on the downstream side in the rotation direction, and the thrust foil bearing 3 can be cooled efficiently.

Further, in the present disclosure, as shown in FIG. 6B, the peak P of the bent portion 13 exists on the outer peripheral side of the top foil piece 11. Therefore, as shown in FIG. 5 described above, at a location in which the high pressure due to the fluid lubricating film easily acts and the deflection in the radial direction is likely to be maximized, the bending rigidity of the top foil piece 11 in the radial direction can be increased. Therefore, bending in the radial direction on the downstream end side of the top foil 10 can be effectively suppressed.

Although an embodiment of the present disclosure has been described above while referring to the drawings, the present disclosure is not limited to the above embodiment. Various shapes and combinations of the constituent members shown in the above-described embodiment are examples, and can be variously changed on the basis of design requirements and the like without departing from the spirit of the present disclosure.

For example, the thrust foil bearing 3 of the present disclosure may adopt the form shown in FIGS. 7A to 11. In the following description, the same or equivalent configurations as those in the above-described embodiment are designated by the same reference numerals, and the description thereof will be simplified or omitted.

Figure 7A:
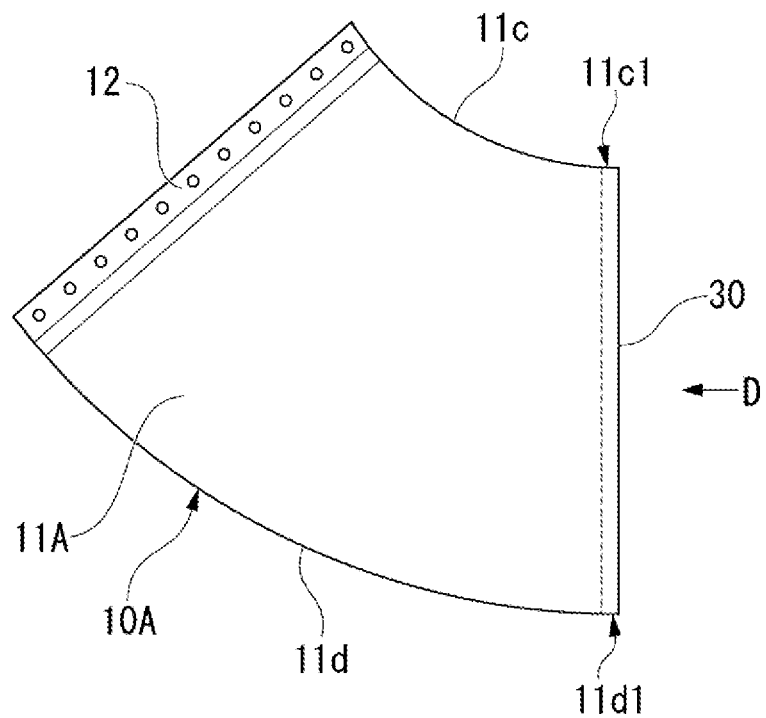
FIG. 7A is a configuration diagram showing a top foil piece according to a modified example of the present disclosure.
Figure 7B:
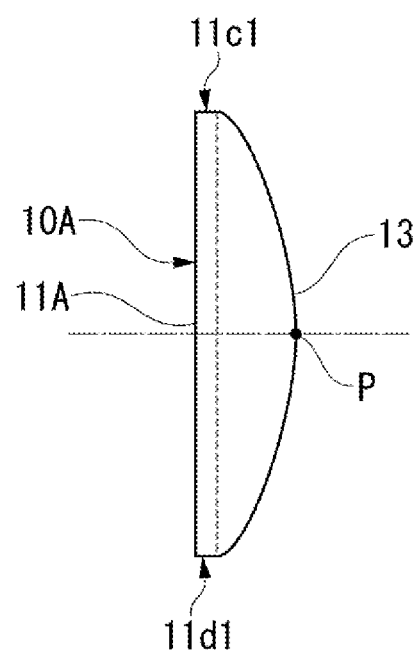
FIG. 7B is a configuration diagram showing the top foil piece according to the modified example of the present disclosure.

FIGS. 7A and 7B are configuration diagrams showing a top foil piece 11A according to a modified example of the present disclosure. FIG. 7A shows a plan view, and FIG. 7B shows a diagram taken along an arrow D in FIG. 7A (a diagram viewed from D in the direction of the arrow in the drawing).

As shown in FIG. 7B, the top foil piece 11A (top foil 10A) has a peak P of the bent portion 13 in an intermediate portion of the top foil piece 11A in the radial direction. Here, the intermediate portion of the top foil piece 11A in the radial direction means a central region when the top foil piece 11A is divided into three in the radial direction. According to this configuration, when the bending in the radial direction on the downstream end side of the top foil piece 11A is maximized in the intermediate portion by the support rigidity of the bump foil piece 21, the bending can be effectively suppressed.

Figure 8A:
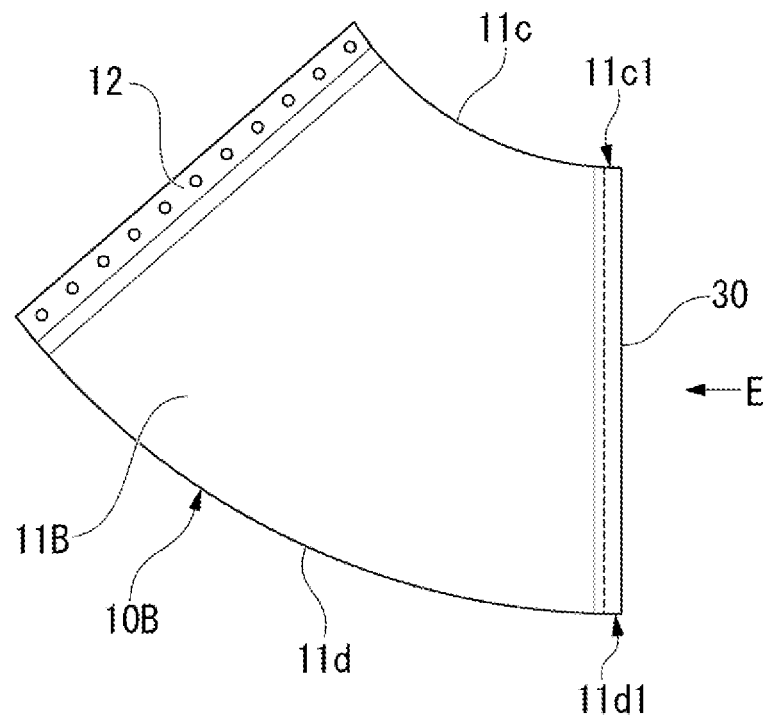
FIG. 8A is a configuration diagram showing a top foil piece according to the modified example of the present disclosure.
Figure 8B:
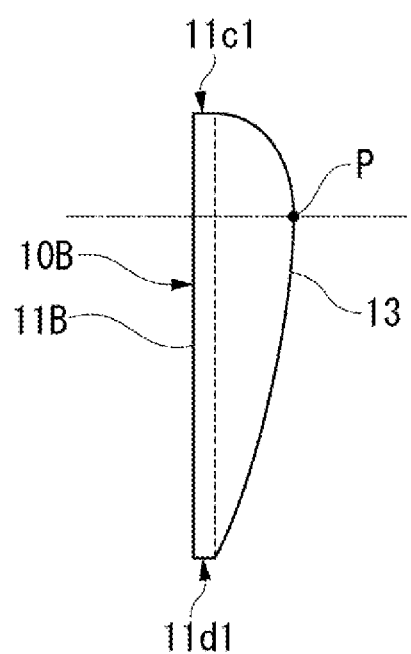
FIG. 8B is a configuration diagram showing the top foil piece according to the modified example of the present disclosure.

FIGS. 8A and 8B are configuration diagrams showing a top foil piece 11B according to a modified example of the present disclosure. FIG. 8A shows a plan view, and FIG. 8B shows a diagram taken along an arrow E in FIG. 8A (a diagram viewed from E in the direction of the arrow in the drawing).

As shown in FIG. 8B, the top foil piece 11B (top foil 10B) has a peak P of the bent portion 13 on the inner peripheral side of the top foil piece 11B. Here, the inner peripheral side of the top foil piece 11B means a region on the innermost side in the radial direction when the top foil piece 11B is divided into three in the radial direction. According to this configuration, when the bending in the radial direction on the downstream end side of the top foil piece 11B is maximized on the inner peripheral side by the support rigidity of the bump foil piece 21, the bending can be effectively suppressed.

By changing the radial position of the peak P of the bent portion 13 in this way, the degree of freedom in designing the bump foil piece 21 is improved.

Figure 9A:
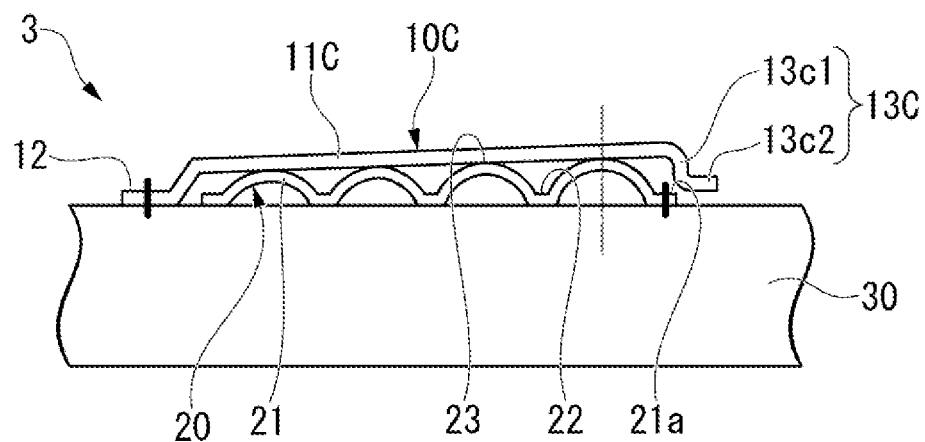
FIG. 9A is a side view showing top foil pieces according to the modified example of the present disclosure.
Figure 9B:
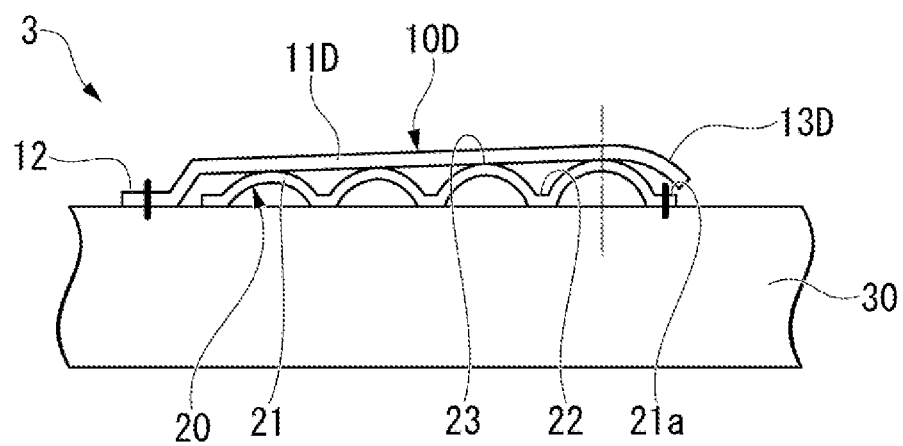
FIG. 9B is a side view showing the top foil pieces according to the modified example of the present disclosure.

FIGS. 9A and 9B are side views showing top foil pieces 11C and 11D according to modified examples of the present disclosure.

A top foil piece 11C (top foil 10C) shown in FIG. 9A has a bent portion 13C in which a plurality of bends are formed. The bent portion 13C has a first bent portion 13c1 which is bent at a substantially right angle from the downstream end side of the top foil piece 11C to the base plate 30, and a second bent portion 13c2 which is bent at a substantially right angle from the lower end of the first bent portion 13c1 to the downstream side in the rotation direction along the plane of the base plate 30. That is, the bent portion 13C includes a bent portion 13c1 that is bent toward the surface of the top foil piece 11C facing the base plate 30, and a bent portion 13c2 that is bent toward the back surface side of the surface of the top foil piece 11C facing the base plate 30. According to this configuration, it is possible to increase the rigidity (cross-sectional secondary moment) of the top foil piece 11 against bending in the radial direction. Further, the flow of the fluid on the back side of the top foil piece 11 is also less likely to be obstructed. Further, a plurality of bends of the bent portion 13C may be further formed.

Further, as in the top foil piece 11D (top foil 10D) shown in FIG. 9B, the bent portion 13D curved in a circular arc shape may be provided. In the present disclosure, the end edge of the bent portion 13D is inclined and terminated when viewed in the circumferential direction. According to this configuration, when the lubricating fluid compressed from the upstream side of the top foil piece 11 to generate heat is discharged from the downstream end side of the top foil piece 11, a vortex of fluid is hard to occur by the curved shape of the bent portion 13. Therefore, it is easy to guide the heat-generated lubricating fluid to the base plate 30 side in which the temperature is low. As a result, since the temperature of the lubricating fluid flowing into the adjacent top foil piece 11 disposed on the downstream side in the rotation direction is lowered, the cooling effect of the thrust foil bearing 3 is enhanced.

Figure 10A:
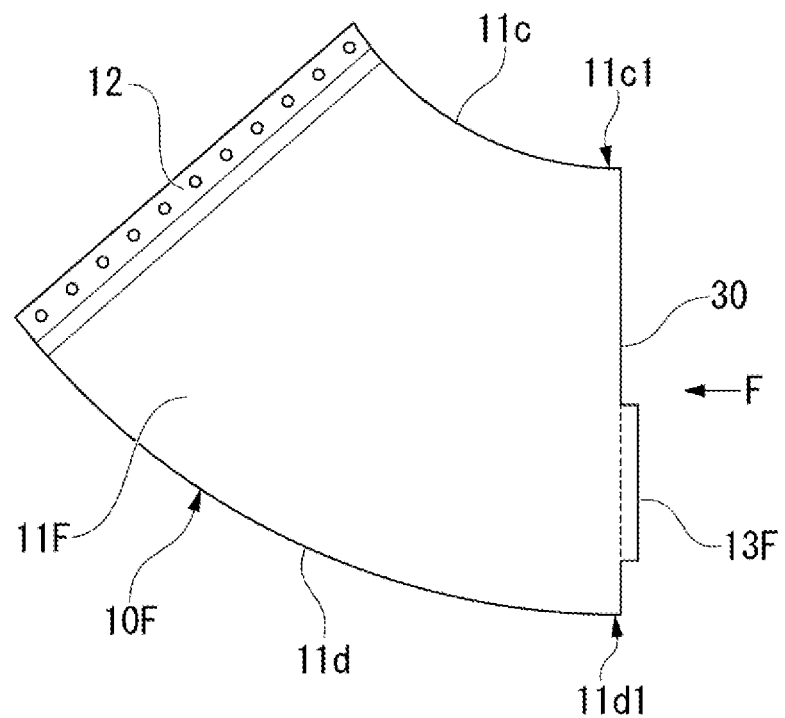
FIG. 10A is a configuration diagram showing a top foil piece according to the modified example of the present disclosure.
Figure 10B:
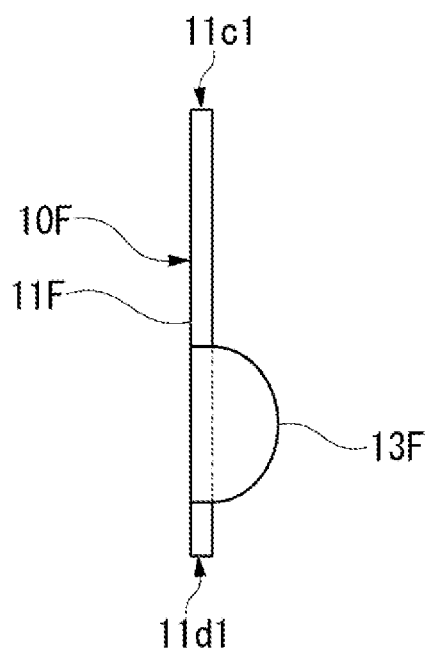
FIG. 10B is a configuration diagram showing the top foil piece according to the modified example of the present disclosure.

FIGS. 10A and 10B are configuration diagrams showing a top foil piece 11F according to a modified example of the present disclosure. In addition, FIG. 10A shows a plan view, and FIG. 10B shows a diagram taken along an arrow F in FIG. 10A (a diagram viewed from F in the direction of the arrow in the drawing).

Further, as in the top foil piece 11F (top foil 10F) shown in FIG. 10A, a bent portion 13F may be provided on a part on the downstream end side of the top foil piece 11F. The bent portion 13F may be formed at a position where the pressure in the radial direction on the downstream end side of the top foil piece 11F is maximized.

Figure 11:
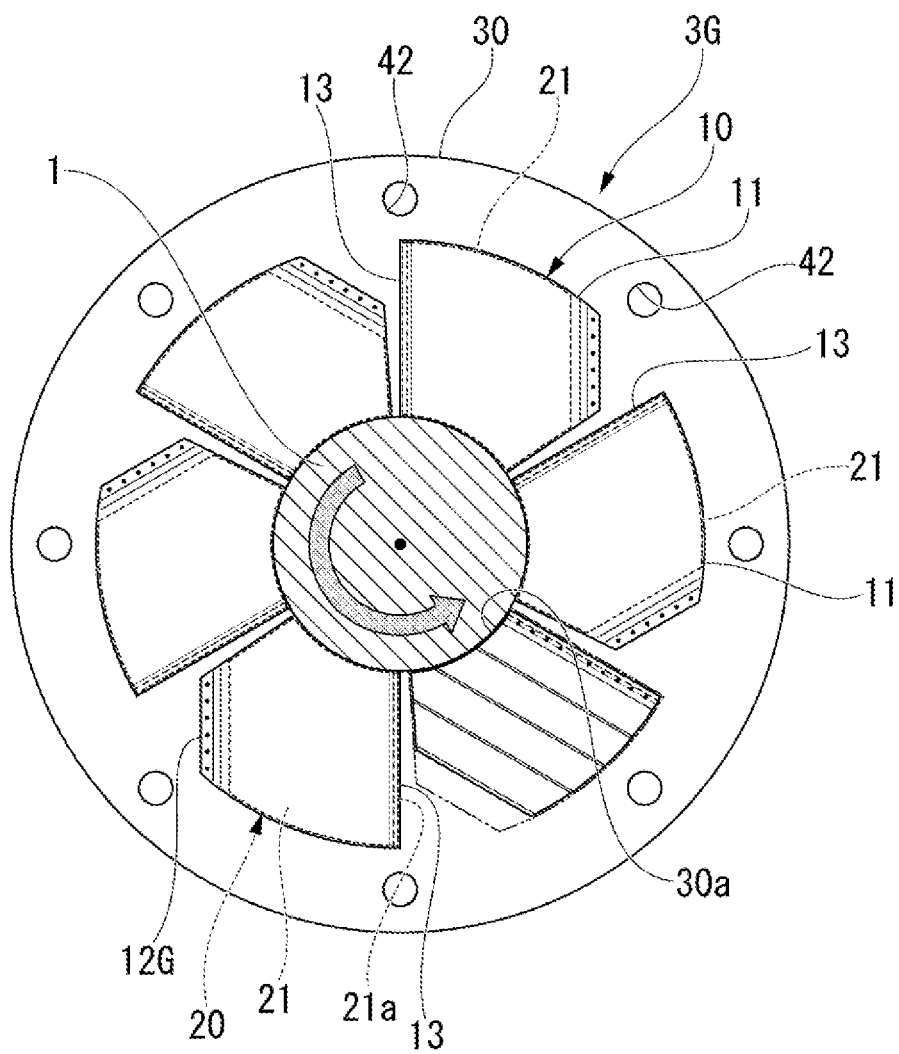
FIG. 11 is a plan view showing a thrust foil bearing according to the modified example of the present disclosure.

FIG. 11 is a plan view showing a thrust foil bearing 3G according to a modified example of the present disclosure.

In the thrust foil bearing 3G shown in FIG. 11, as disclosed in Japanese Unexamined Patent Application, First Publication No. 2014-145388, a fixed end 12G of the top foil piece 11 is formed to be inclined with respect to a straight line extending in the radial direction about the rotation shaft 1 to continuously approach the downstream side in the rotation direction of the rotation shaft 1 from the inner peripheral side toward the outer peripheral side thereof. According to this configuration, since the bent portion 13 can be easily formed without interfering with (not overlapping) the top foil piece 11 on the downstream side in the rotation direction, the bearing load capacity of the thrust foil bearing 3 can be improved.

Further, for example, in the aforementioned embodiment, the top foil 10 is formed from a plurality of top foil pieces 11 and the bump foil 20 is formed from a plurality of bump foil pieces 21, but each of the top foil 10 and the bump foil 20 may be formed from a single foil continuously in the circumferential direction.

INDUSTRIAL APPLICABILITY

By applying the thrust foil bearing of the present disclosure to relevant field, it is possible to suppress bending in the radial direction on the downstream end side of the top foil.

What is claimed is:

1. A thrust foil bearing comprising:
   a base plate provided with an insertion hole through which a shaft is inserted;
   a corrugated bump foil placed around the insertion hole and supported by the base plate; and
   a top foil piece which is supported by the bump foil, and in which a first side in a circumferential direction of the insertion hole is attached to the base plate, and a second side in the circumferential direction of the insertion hole is a free end,
wherein
   a bent portion which is bent toward the base plate is formed on the second side of the top foil piece in the circumferential direction, and
   the bent portion has a curved shape including a single peak which is located between inner and outer circumferences of the top foil piece, and the single peak being closest to the base plate.

2. The thrust foil bearing according to claim 1, wherein the peak is located between a center and the outer circumference of the top foil piece in a radial direction of the insertion hole.

3. The thrust foil bearing according to claim 1, wherein a plurality of bends are formed in the bent portion.

4. The thrust foil bearing according to claim 1, wherein the bent portion is curved in a circular arc shape.

* * * * *